United States Patent
Ji et al.

(10) Patent No.: US 12,063,648 B2
(45) Date of Patent: Aug. 13, 2024

(54) DATA TRANSMISSION METHOD AND COMMUNICATION APPARATUS

(71) Applicant: HUAWEI TECHNOLOGIES CO., LTD., Guangdong (CN)

(72) Inventors: Liuliu Ji, Shanghai (CN); Shibin Ge, Shanghai (CN); Haicun Hang, Shanghai (CN); Xiaohan Wang, Shanghai (CN); Xiaoyan Bi, Ottawa (CA); Hongzhe Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/371,300

(22) Filed: Jul. 9, 2021

(65) Prior Publication Data
US 2021/0337572 A1 Oct. 28, 2021

Related U.S. Application Data

(63) Continuation of application No. PCT/CN2020/071598, filed on Jan. 11, 2020.

(30) Foreign Application Priority Data

Jan. 11, 2019 (CN) .......................... 201910028430.7

(51) Int. Cl.
*H04W 72/1273* (2023.01)
*H04W 72/0446* (2023.01)
(Continued)

(52) U.S. Cl.
CPC ... *H04W 72/1273* (2013.01); *H04W 72/0446* (2013.01); *H04W 72/12* (2013.01); *H04W 72/23* (2023.01)

(58) Field of Classification Search
None
See application file for complete search history.

(56) References Cited

U.S. PATENT DOCUMENTS

| | | |
|---|---|---|
| 2018/0084572 A1 | 3/2018 | You et al. |
| 2018/0324765 A1 | 11/2018 | Nammi et al. |

(Continued)

FOREIGN PATENT DOCUMENTS

| | | |
|---|---|---|
| CN | 109076560 A | 12/2018 |
| CN | 109076593 A | 12/2018 |

OTHER PUBLICATIONS

European Patent Office extended Search Report for Application 20738197.1 dated Jan. 25, 2022, 18 pages.
(Continued)

*Primary Examiner* — Alex Skripnikov

(57) ABSTRACT

This application provides a data transmission method and a communication apparatus, to improve data transmission reliability. The method includes: receiving downlink control information (DCI); determining a plurality of pieces of quasi-co-location (QCL) information based on the DCI; and receiving downlink data based on the plurality of pieces of QCL information. The plurality of pieces of QCL information correspond to a plurality of time domain units, each time domain unit corresponds to at least one piece of QCL information, and at least two of the plurality of pieces of QCL information are different, that is, the downlink data is from at least two network devices.

27 Claims, 4 Drawing Sheets

(51) Int. Cl.
  *H04W 72/12* (2023.01)
  *H04W 72/23* (2023.01)

(56) References Cited

U.S. PATENT DOCUMENTS

2018/0331727 A1  11/2018  John Wilson et al.
2018/0343653 A1  11/2018  Guo
2022/0045893 A1* 2/2022  Yamada ................ H04L 5/0044

OTHER PUBLICATIONS

Chinese Office Action for Application No. 201910028430.7 dated Jul. 19, 2022, 15 pages.
Huawei, HiSilicon, Enhancements on multi-TRP/panel transmission. 3GPP TSG RAN WG1 Meeting #95, Spokane, USA, Nov. 12-16, 2018, R1-1812243, 9 pages.
CATT, Multi-TRP/panel transmission enhancement for Rel-16. 3GPP TSG RAN WG1 Meeting #95, Spokane, USA, Nov. 12-16, 2018, R1-1812635, 12 pages.
LG Electronics, Correction on slot-PDSCH repetition for TDD. 3GPP TSG RAN WG1 Meeting #95, Spokane, USA, Nov. 12-16, 2018, R1-1813734, 2 pages.
NTT Docomo, Inc., Enhancements on multi-TRP/panel transmission. 3GPP TSG RAN WG1 Meeting #95, Spokane, USA, Nov. 12-16, 2018, R1-1813333, 20 pages.
CATT, Discussion on enhanced PDCCH for NR URLLC. 3GPP TSG RAN WG1 Meeting #92 , Athens, Greece, Feb. 26-Mar. 2, 2018, R1-1801750, 4 pages.
International Search Report and Written Opinion issued in PCT/CN2020/071598, dated Apr. 13, 2020, 9 pages.
Samsung, Summary of Open Issues on Layer Mapping. 3GPP TSG RAN WG1 Meeting #90, Prague, P.R. Czechia 21th Aug. 25, 2017, R1-1714662, 4 pages.
Chinese Office Action for Application No. 201910028430 dated Jul. 16, 2023, 4 pages.

* cited by examiner

DATA TRANSMISSION METHOD AND COMMUNICATION APPARATUS

CROSS-REFERENCE TO RELATED APPLICATIONS

This application is a continuation of International Application No. PCT/CN2020/071598, filed on Jan. 11, 2020, which claims priority to Chinese Patent Application No. 201910028430.7, filed on Jan. 11, 2019, The disclosures of the aforementioned applications are hereby incorporated by reference in their entireties.

TECHNICAL FIELD

This application relates to the communication field, and more specifically, to a data transmission method and a communication apparatus.

BACKGROUND

A new radio access technology (NR) or another advanced communication technology can support more communication application scenarios. Among these application scenarios, some scenarios, for example, ultra-reliable low-latency communication (URLLC), have higher requirements on communication reliability. The technology has a reliability requirement of $10^{-5}$ or even higher, which means that at most one error (1-bit error) occurs during $10^{-5}$ or more transmissions.

To improve the communication reliability, a method used in a current technology is repeatedly transmitting the same data for a plurality of times in a plurality of consecutive slots, and each of the plurality of re-transmissions may correspond to one redundancy version (RV). However, the transmission solution depends on a time-domain correlation of a channel. A diversity gain can be obtained through a plurality of transmissions only when the channel rapidly changes in time domain. For example, assuming that data transmitted in a slot 1 fails to be demodulated and the data is transmitted again in a slot 2, and a channel corresponding to the slot 1 and a channel corresponding to the slot 2 are highly correlated, the data transmitted in the slot 2 may fail to be demodulated. Only when there is a relatively large difference between the channel corresponding to the slot 2 and the channel corresponding to the slot 1, a success probability of the second transmission can be improved.

It can be learned that the existing transmission solution may cause a data transmission failure. Therefore, how to improve data transmission reliability becomes an urgent problem to be resolved.

SUMMARY

This application provides a data transmission method and a communication apparatus, to improve data transmission reliability.

According to a first aspect, a data transmission method is provided. The method includes: receiving downlink control information (DCI); determining a plurality of pieces of quasi-co-location (QCL) information based on the DCI, where the plurality of pieces of QCL information correspond to a plurality of time domain units, each time domain unit corresponds to at least one piece of QCL information, and at least two of the plurality of pieces of QCL information are different; and receiving downlink data based on the plurality of pieces of QCL information.

According to a second aspect, a data transmission method is provided. The method includes: sending downlink control information DCI, where the DCI includes a plurality of pieces of quasi-co-location QCL information, the plurality of pieces of QCL information correspond to a plurality of time domain units, each time domain unit corresponds to at least one piece of QCL information, and at least two of the plurality of pieces of QCL information are different; and sending downlink data based on the plurality of pieces of QCL information.

Optionally, the plurality of pieces of QCL information are used for a plurality of re-transmissions of the same downlink data. The same downlink data means that information bits or coded bits of bit streams corresponding to the downlink data are the same, or the like.

Optionally, a plurality of TCI states correspond one-to-one to the plurality of time domain units. For example, a quantity of the pieces of QCL information may be the same as a quantity of the time domain units, and each time domain unit may correspond to a same quantity of pieces of QCL information. In addition, quantities of pieces of QCL information corresponding to at least two time domain units may be different. If one time domain unit corresponds to at least two pieces of QCL information, the two pieces of QCL information may be the same or may be different. If the at least two pieces of QCL information corresponding to each time domain unit are the same, QCL information corresponding to at least two time domain units may be different.

In addition, the quantity of the pieces of QCL information may alternatively be different from the quantity of the time domain units. Further, the quantity of the pieces of QCL information and the quantity of the time domain units may be related to a first parameter. For example, the quantity of the pieces of QCL information may be a product of the quantity of the time domain units and the first parameter. The first parameter may be a quantity of codewords (CW) in one time domain unit, a quantity of transport blocks in one time domain unit, a quantity of antenna port groups in one time domain unit, a quantity of antenna ports/layers/data streams in one time domain unit, a quantity of code division multiplexing groups in one time domain unit, or the like.

When the first parameter is 1, the quantity of the pieces of QCL information may be the same as the quantity of the time domain units.

For example, a terminal device may determine the quantity of the time domain units and the first parameter based on repeated transmission indication information configured by a higher layer. The repeated transmission indication information is used to indicate a quantity of re-transmissions. The terminal device may determine the quantity of the time domain units and the first parameter with reference to a preset rule and the repeated transmission indication information configured by the higher layer. The preset rule is specifically as follows: For example, when the quantity of re-transmissions is less than a repetition threshold, the first parameter is 1, and the quantity of the time domain units is the quantity of re-transmissions. When the quantity of re-transmissions is greater than the repetition threshold, the first parameter is a first constant, and the quantity of the time domain units is a dependent variable of a function in which the quantity of re-transmissions and the first constant are used as independent variables. For example, the quantity of the time domain units is a ratio of the quantity of re-transmissions to the first constant.

Alternatively, when the quantity of re-transmissions is greater than the repetition threshold, the quantity of the time domain units is a second constant, and the first parameter is a dependent variable of a function in which the quantity of re-transmissions and the quantity of the time domain units are used as independent variables. For example, the first parameter is a ratio of the quantity of re-transmissions to the quantity of the time domain units.

When the quantity of re-transmissions is equal to the repetition threshold, the first parameter may be 1 or the first constant, or the first parameter is the dependent variable of the function in which the quantity of re-transmissions and the quantity of the time domain units are used as independent variables.

The repetition threshold may be a preset constant, for example, 2 or 4. The first constant is a preset constant, for example, 2. The second constant is a preset constant, for example, 2 or 4. That is, when the quantity of re-transmissions is less than the repetition threshold, one time domain unit corresponds to one transmission; or when the quantity of re-transmissions is greater than the repetition threshold, one time domain unit may correspond to a plurality of re-transmissions; or when the quantity of re-transmissions is equal to the repetition threshold, one time domain unit corresponds to one transmission or corresponds to a plurality of re-transmissions.

The QCL information is used to determine a quasi-co-location relationship between at least one demodulation reference signal (DMRS) port and at least one reference signal. The QCL information further includes at least one large-scale channel parameter associated with the quasi-co-location relationship between the at least one DMRS port and the at least one reference signal. The at least one large-scale channel parameter may be represented by using a QCL type. When the QCL information is used to determine the quasi-co-location relationship between the at least one DMRS port and a plurality of reference signals, at least one large-scale channel parameter corresponding to the plurality of reference signals is at least partially different, that is, the plurality of reference signals correspond to different quasi-co-location types.

The plurality of time domain units may be consecutive or nonconsecutive in time domain. This is not limited in this application. In addition, there may be a time domain unit that is not used for downlink transmission in the plurality of time domain units, for example, a time domain unit used for uplink transmission. In this case, the terminal device does not receive data in the time domain unit used for uplink transmission, and QCL information corresponding to the time domain unit used for uplink transmission is considered as useless information.

The time domain unit may also be referred to as a time unit. Optionally, the time domain unit may be a slot, a mini-slot, a symbol, a subframe, a frame, a system frame, a radio frame, a half-frame, or the like. This is not limited in this application.

Therefore, according to the data transmission method provided in this application, because at least two of the plurality of pieces of QCL information corresponding to the plurality of time domain units are different, that is, at least two of a plurality of transmissions performed in the plurality of time domain units are from different network devices, data transmission reliability can be improved.

With reference to the first aspect and the second aspect, in some implementations, each piece of QCL information is associated with at least one of a redundancy version of the downlink data or an antenna port group of the downlink data.

There is a one-to-one correspondence between an identifier of an antenna port and an identifier of a DMRS port in this application, and each piece of QCL information may be further associated with a DMRS port group of the downlink data.

For example, each piece of QCL information may be associated with one redundancy version of the downlink data; or each piece of QCL information may be associated with one antenna port group of the downlink data; or each piece of QCL information may be associated with both one redundancy version of the downlink data and one antenna port group of the downlink data. The antenna port group in this application may include one or more antenna ports, and the antenna port may be, for example, a DMRS port.

The QCL information is associated with at least one of the redundancy version of the downlink data and the antenna port group of the downlink data, so that the terminal device can determine, based on the QCL information, at least one of the redundancy version of the downlink data or the antenna port group used to receive the downlink data. When different QCL information is associated with different redundancy versions or antenna port groups used to receive the downlink data, the data transmission reliability can be further improved.

With reference to the first aspect and the second aspect, in some implementations, the DCI includes a plurality of pieces of transmission configuration indicator (TCI) indication information, each piece of TCI indication information is used to indicate one TCI state, and each TCI state includes at least one of the plurality of pieces of QCL information.

The plurality of pieces of TCI indication information are used to indicate the plurality of TCI states, and the TCI state may be flexibly configured.

With reference to the first aspect and the second aspect, in some implementations, the DCI includes one piece of transmission configuration indicator TCI indication information, the TCI indication information is used to indicate one TCI state group, the TCI state group includes a plurality of TCI states, and each TCI state includes at least one of the plurality of pieces of QCL information.

One piece of TCI indication information is used to indicate one TCI state group to indicate the plurality of pieces of QCL information, so that signaling overheads required for configuring the QCL information can be reduced.

With reference to the first aspect and the second aspect, in some implementations, the TCI state group is one of a plurality of TCI state groups, and the plurality of TCI state groups are configured by a network device by using a media access control control element (MAC CE).

With reference to the first aspect and the second aspect, in some implementations, the plurality of TCI state groups are TCI state groups configured by the network device by using radio resource control (RRC) signaling.

With reference to the first aspect and the second aspect, in some implementations, the plurality of TCI states correspond to the plurality of time domain units through cyclic extension or adjacent extension.

For example, assuming that the quantity of the plurality of time domain units is 4, and the DCI may include two TCI fields, four TCI states may be obtained by cyclically extending or adjacently extending TCI states indicated by the two TCI fields, and the four TCI states correspond one-to-one to the four time domain units. After cyclic extension or adjacent extension, TCI states used for adjacent time domain units are the same and a same TCI state corresponds only to adjacent time domain unit, or TCI states used for adjacent time domain units are different.

With reference to the first aspect and the second aspect, in some implementations, the TCI state includes first QCL information and second QCL information, the first QCL information includes a first reference signal and a first QCL type, the second QCL information includes a second reference signal and the first QCL type, the first reference signal is different from the second reference signal, the first reference signal and a first antenna port group satisfy a QCL relationship, and the second reference signal and a second antenna port group satisfy the QCL relationship.

Optionally, the first QCL type may be a QCL type A.

Further, the first QCL information further includes a third reference signal and a second QCL type, the second QCL information further includes a fourth reference signal and the second QCL type, the third reference signal is different from the fourth reference signal, the third reference signal and the first antenna port group satisfy the QCL relationship, and the fourth reference signal and the second antenna port group satisfy the QCL relationship.

Optionally, the second QCL type may be a QCL type D.

Optionally, the first antenna port group and the second antenna port group are associated with a same time domain unit in the plurality of time domain units.

That is, downlink data transmitted in a same time domain unit comes from two different network devices, so that the data transmission reliability can be improved.

According to a third aspect, a communication apparatus is provided. The apparatus includes each module or unit configured to perform the method according to any one of the first aspect or the possible implementations of the first aspect.

According to a fourth aspect, a communication apparatus is provided. The apparatus includes a processor. The processor is coupled to a memory, and may be configured to execute instructions in the memory, to implement the method according to any one of the first aspect or the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fifth aspect, a communication apparatus is provided. The apparatus includes each module or unit configured to perform the method according to any one of the second aspect or the possible implementations of the second aspect.

According to a sixth aspect, a communication apparatus is provided. The apparatus includes a processor. The processor is coupled to a memory, and may be configured to execute instructions in the memory, to implement the method according to any one of the second aspect or the possible implementations of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in a network device. When the communication apparatus is the chip disposed in the network device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to receive a signal by using the input circuit, and transmit a signal by using the output circuit, so that the processor performs the method according to any one of the first aspect, the second aspect, or the possible implementations of the first aspect or the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eighth aspect, a processing apparatus is provided. The apparatus includes a processor and a memory. The processor is configured to: read instructions stored in the memory, receive a signal by using a receiver, and transmit a signal by using a transmitter, to perform the method according to any one of the first aspect, the second aspect, or the possible implementations of the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, sending of indication information, may be a process of outputting the indication information from the processor, and receiving of capability information, may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be a chip. The processor may be implemented by using hardware, or may be implemented by using software. When the processor is implemented by using hardware, the processor may be a logic circuit, an integrated circuit, or the like; or when the processor is implemented by using software, the processor may be a general purpose processor, and is implemented by reading software code stored in the memory. The memory may be integrated into the processor, or may exist independently outside the processor.

According to a ninth aspect, a computer program product is provided. The computer program product includes a computer program (which is also referred to as code or instructions). When the computer program runs, a computer is enabled to perform the method according to any one of the first aspect, the second aspect, or the possible implementations of the first aspect or the second aspect.

According to a tenth aspect, a computer-readable medium is provided. The computer-readable medium stores a computer program (which is also referred to as code or instructions). When the computer program runs on a computer, the computer is enabled to perform the method according to any one of the first aspect, the second aspect, or the possible implementations of the first aspect or the second aspect.

According to an eleventh aspect, a communication system is provided. The communication system includes the foregoing network device and the foregoing terminal device.

DESCRIPTION OF EMBODIMENTS

The following describes technical solutions of this application with reference to the accompanying drawings.

The technical solutions in the embodiments of this application may be used in various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system. For ease of understanding of this application, a communication system to which this application is applicable is first described in detail with reference to FIG. 1.

Figure 1:
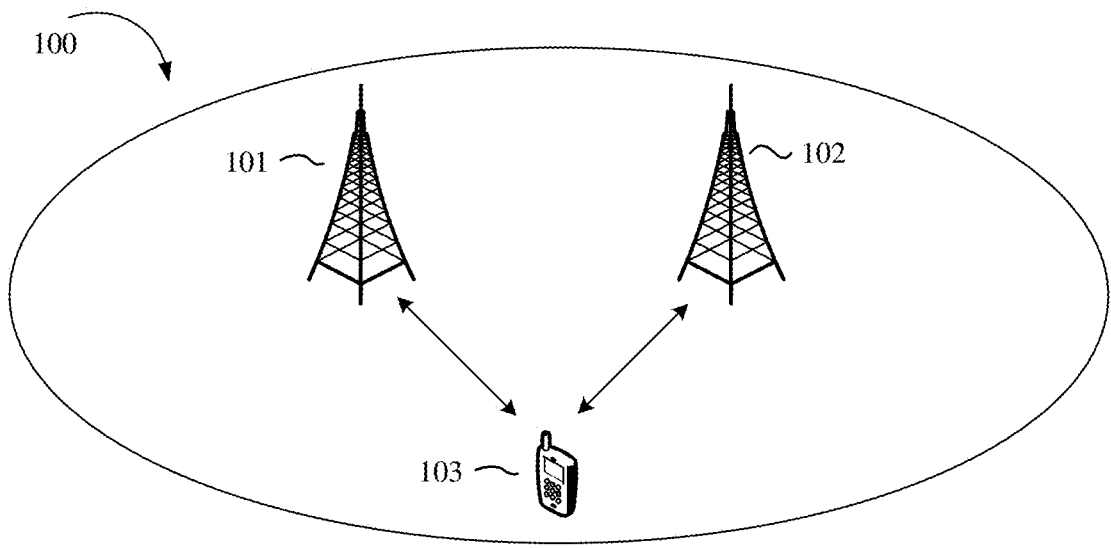
FIG. 1 is a schematic diagram of a communication system to which an embodiment of this application is applicable.

FIG. 1 is a schematic diagram of a communication system 100 to which a data transmission method and an apparatus according to the embodiments of this application are applicable. As shown in FIG. 1, the communication system 100 may include at least two network devices such as network devices 101 and 102 shown in FIG. 1. The communication system 100 may further include at least one terminal device such as a terminal device 103 shown in FIG. 1. The terminal device 103 may establish a radio link to the network device 101 and the network device 102 by using a dual connectivity (DC) technology or a multi-connectivity technology. The network device 101 may be, for example, a primary base station, and the network device 102 may be, for example, a secondary base station. In this case, the network device 101 is a network device initially accessed by the terminal device 103, and is responsible for radio resource control (RRC) communication with the terminal device 103. The network device 102 may be added during RRC reconfiguration, and is configured to provide an additional radio resource.

Certainly, the network device 102 may alternatively be a primary base station, and the network device 101 may alternatively be a secondary base station. This is not limited in this application. In addition, for ease of understanding, only a case in which the two network devices are connected to the terminal device in a wireless manner is shown in the figure. However, this should not constitute any limitation on a scenario to which this application is applicable. The terminal device may further establish a radio link to more network devices.

A plurality of antennas may be configured for each communication device, such as the network device 101, the network device 102, or the terminal device 103 in FIG. 1. The plurality of antennas may include at least one transmit antenna used to send a signal and at least one receive antenna used to receive a signal. In addition, each communication device additionally includes a transmitter chain and a receiver chain. A person of ordinary skill in the art may understand that the transmitter chain and the receiver chain each may include a plurality of components related to signal sending and receiving (for example, a processor, a modulator, a multiplexer, a demodulator, a demultiplexer, or an antenna). Therefore, the network device and the terminal device may communicate with each other by using a multiple-antenna technology.

It should be understood that the network device in the wireless communication system may be any device that has wireless sending and receiving functions. The device includes but is not limited to an evolved NodeB (eNB), a radio network controller (RNC), a NodeB (NB), a base station controller (BSC), a base transceiver station (BTS), a home base station (for example, a home evolved NodeB, or a home Node B, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system, one antenna panel or a group of antenna panels (including a plurality of antenna panels) of a gNodeB in a 5G system, or a network node, such as a baseband unit (BBU) or a distributed unit (DU), that constitutes a gNB or a transmission point.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling is sent by the DU or is sent by the DU and the CU. It may be understood that the network device may be a CU node, a DU node, or a device including a CU node and a DU node. In addition, the CU may be classified as a network device in an access network (RAN), or the CU may be classified as a network device in a core network (CN). This is not limited in this application.

It should be further understood that the terminal device in the wireless communication system may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device in the embodiments of this application may be a mobile phone, a tablet computer (pad), a computer having wireless sending and receiving functions, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may include any one or more of computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software. In addition, a specific structure of an execution body of the method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or carry instructions and/or data.

To improve communication reliability, a method used in a current technology is repeatedly transmitting same data for a plurality of times in a plurality of consecutive slots, and each of the plurality of re-transmissions may correspond to one redundancy version (RV). However, the transmission solution depends on a time-domain correlation of a channel A diversity gain can be obtained through a plurality of transmissions only when the channel rapidly changes in time domain. For example, assuming that data transmitted in a slot 1 fails to be demodulated and the data is transmitted again in a slot 2, and a channel corresponding to the slot 1 and a channel corresponding to the slot 2 are highly correlated, the data transmitted in the slot 2 may fail to be demodulated. Only when there is a relatively large difference between the channel corresponding to the slot 2 and the channel corresponding to the slot 1, a success probability of the second transmission can be improved. To improve transmission reliability, this application provides a data transmission method. In this method, a space domain and a time domain are combined, and data is sent to a terminal device on a plurality of time domain resources by using at least two different space domain resources, to increase a success probability of data transmission. The following describes the solutions provided in this application.

For ease of understanding the embodiments of this application, the following first briefly describes several terms in this application.

1. Reference signal: The reference signal may be used for channel measurement, channel estimation, or the like. A resource of the reference signal may be used to configure transmission attributes, for example, a time-frequency resource position, a port mapping relationship, a power factor, and a scrambling code, of the reference signal. For details, refer to a current technology.

The reference signal may include, for example, a channel state information reference signal (CSI-RS), a synchronization signal block (SSB), and a sounding reference signal (SRS). Correspondingly, the resource of the reference signal may include a CSI-RS resource, an SSB resource, or an SRS resource.

It should be noted that the foregoing SSB may also be referred to as a synchronization signal (SS) and physical broadcast channel block (PBCH block). It should be understood that the reference signals enumerated above are merely examples for description, and should not constitute any limitation on this application. This application does not exclude a possibility of defining another reference signal in a future protocol to implement a same or similar function.

2. Antenna port: The antenna port is referred to as a port for short. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

3. Quasi-co-location (QCL): The quasi-co-location is also referred to as quasi-colocation. Signals corresponding to antenna ports that have a QCL relationship have a same parameter, or a parameter of one antenna port may be used to determine a parameter of another antenna port that has a QCL relationship with the antenna port, or two antenna ports have a same parameter, or a parameter value difference between two antenna ports is less than a threshold. The parameter is a large-scale channel parameter, and may include one or more of the following: a delay spread, a Doppler spread, a Doppler shift, an average delay, an average gain, and a spatial reception parameter. The spatial reception parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

In an NR protocol, the QCL relationship may be classified into the following four types based on different parameters:
type A: the Doppler shift, the Doppler spread, the average delay, and the delay spread;
type B: the Doppler shift and the Doppler spread;
type C: the Doppler shift and the average delay; and
type D: the spatial reception parameter.

4. Redundancy version: One redundancy version of data is a coded bit subset that is determined, based on an index of the redundancy version, from coded bits of the data that are obtained through coding. The index of the redundancy version corresponds to a start bit position of the coded bit subset in the coded bits.

5. Time domain unit:
The time domain unit in this application may be a slot, a mini-slot, a symbol, a subframe, a frame, a system frame, a radio frame, a half-frame, or the like. This is not limited in this application.

Figure 2:
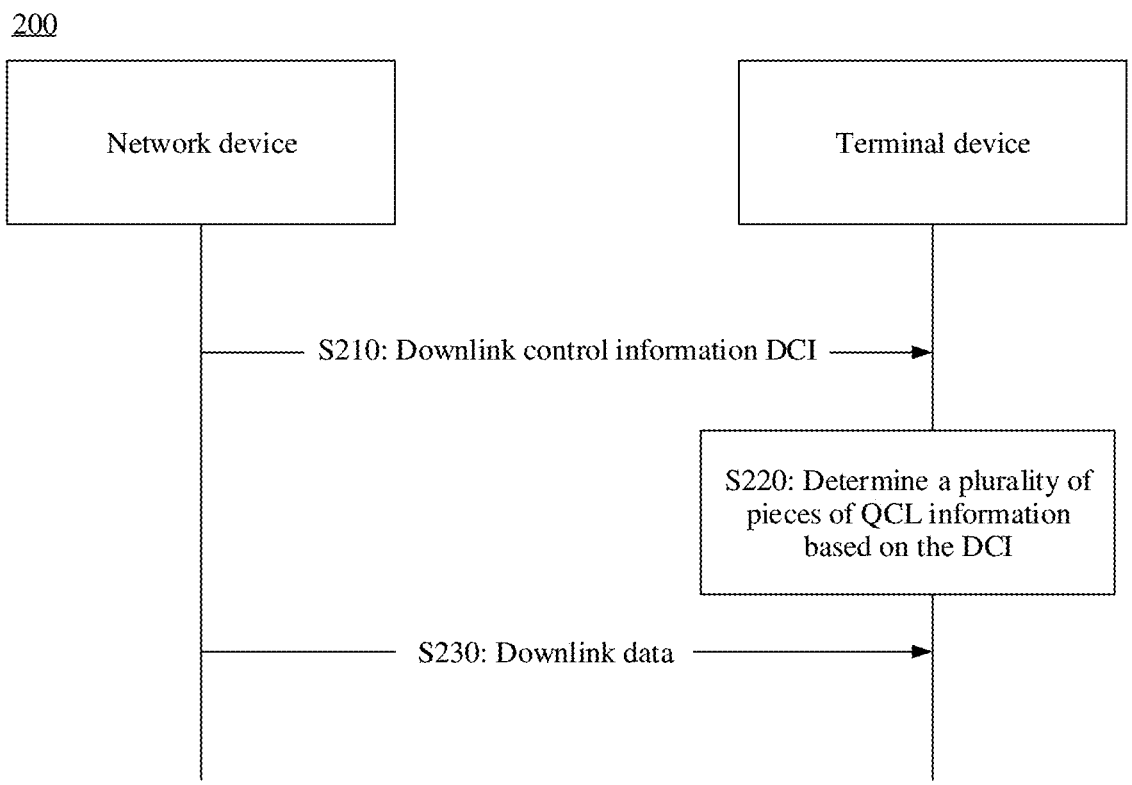
FIG. 2 is a schematic flowchart of a data transmission method according to an embodiment of this application.

FIG. 2 is a schematic flowchart of a data transmission method 200 according to an embodiment of this application. The method may be applied to the system 100 shown in FIG. 1. However, this is not limited in this embodiment of this application. The following describes operations of the method 200.

S210: A terminal device receives DCI sent by a network device.

It should be understood that the network device is any one of a plurality of network devices that can schedule the terminal device. For example, the network device may be a primary base station. However, this is not limited in this application. When the method is applied to the system shown in FIG. 1, for example, the terminal device may be the terminal device 103, and the network device may be the network device 101 or the network device 102.

S220: The terminal device determines a plurality of pieces of QCL information based on the DCI.

The plurality of pieces of QCL information correspond to a plurality of time domain units, and each time domain unit corresponds to at least one piece of QCL information. At least two of the plurality of pieces of QCL information are different.

Optionally, the plurality of pieces of QCL information are used for a plurality of re-transmissions of same downlink data. The same downlink data means that information bits or coded bits of bit streams corresponding to the downlink data are the same.

One piece of QCL information may be used for one transmission or reception. Specifically, one piece of QCL information is used to determine a quasi-co-location relationship between at least one antenna port (or at least one DMRS port) and at least one reference signal. The QCL information further includes at least one large-scale channel parameter associated with the quasi-co-location relationship between the at least one antenna port (or the at least one DMRS port) and the at least one reference signal. The at least one large-scale channel parameter may be represented by using a QCL type. When the QCL information is used to determine a quasi-co-location relationship between at least one antenna port (or at least one DMRS port) and a plurality of reference signals, at least one large-scale channel parameter corresponding to the plurality of reference signals is at least partially different, that is, the plurality of reference signals correspond to different quasi-co-location types.

That two pieces of QCL information are different may mean that two reference signals corresponding to at least one QCL type in the two pieces of QCL information are different. For example, if a reference signal corresponding to a QCL type #1 in QCL information #1 is a reference signal #1, a reference signal corresponding to the QCL type #1 in QCL information #2 is a reference signal #2, and the reference signal #1 and the reference signal #2 are different, this case may be referred to as that the QCL information #1 and the QCL information #2 are different. The QCL type #1 may be, for example, one of a QCL type A, a QCL type B, a QCL type C, and a QCL type D.

A person skilled in the art may understand that one piece of QCL information may represent one channel characteristic, and two different pieces of QCL information represent two different channel characteristics. Therefore, it may be considered that downlink data received based on different QCL information comes from two different network devices, for example, TRPs, panels, or beams.

For example, in this application, a quantity of the pieces of QCL information may be the same as a quantity of the time domain units, and each time domain unit may correspond to a same quantity of pieces of QCL information, or quantities of pieces of QCL information corresponding to at least two time domain units may be different. If one time domain unit corresponds to at least two pieces of QCL information, the two pieces of QCL information may be the same or may be different. If the at least two pieces of QCL information corresponding to each time domain unit are the same, QCL information corresponding to at least two time domain units may be different. For example, two pieces of QCL information corresponding to a time domain unit #1 are both the QCL information #1, a time domain unit #2 may correspond to the QCL information #2, and the QCL information #1 and the QCL information #2 are different.

For example, in this application, a quantity of the pieces of QCL information may be different from a quantity of the time domain units. For example, the plurality of time domain units correspond to different quantities of pieces of QCL information. For example, one of the plurality of time domain units may correspond to one piece of QCL information, and another time domain unit may correspond to two pieces of QCL information.

Further, the quantity of the pieces of QCL information is related to the quantity of the time domain units and a first parameter. For example, the quantity of the pieces of QCL information may be a product of the quantity of the time domain units and the first parameter. The first parameter may be a quantity of codewords in one time domain unit, a quantity of transport blocks in one time domain unit, a quantity of antenna port groups in one time domain unit, a quantity of transport layers or data streams in one time domain unit, a quantity of code division multiplexing groups in one time domain unit, or the like.

It should be understood that, that the QCL information corresponds to the time domain unit means that the network device transmits the downlink data in the time domain unit based on the QCL information. Correspondingly, the terminal device receives the downlink data in the time domain unit based on the QCL information.

Figure 3:
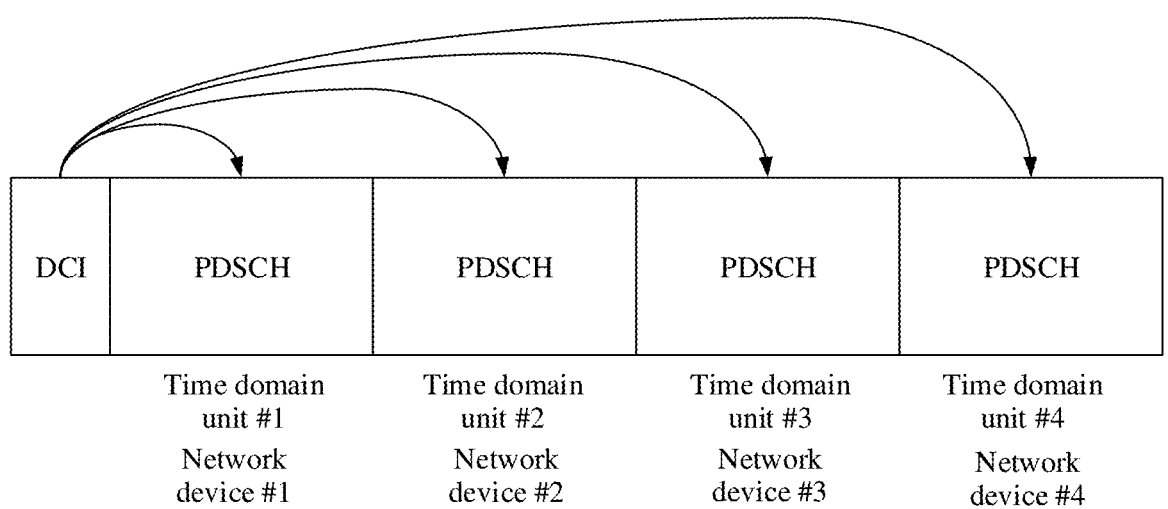
FIG. 3 is a schematic diagram of a specific embodiment of a data transmission method according to embodiments of this application.

In an example, a relationship between the plurality of time domain units and the plurality of pieces of QCL information may be shown in FIG. 3. Referring to FIG. 3, the DCI is used to schedule the terminal device to receive a PDSCH in four time domain units (namely, a time domain unit #1 to a time domain unit #4), the time domain unit #1 to the time domain unit #4 correspond one-to-one to QCL information #1 to QCL information #4, and each piece of QCL information may correspond to one network device. It may be considered that the terminal device separately receives data from a network device #1 to a network device #4 in the time domain unit #1 to the time domain unit #4. Compared with a manner in which only a time domain diversity or only a space domain diversity is used, in this manner of combining a time domain and a space domain, the time domain diversity and the space domain diversity can be fully used to improve data transmission reliability.

In this application, the plurality of time domain units may also be referred to as time units, and may be consecutive or nonconsecutive in time domain. This is not limited in this application. In addition, there may be a time domain unit that is not used for downlink transmission in the plurality of time domain units, for example, a time domain unit used for uplink transmission. In this case, the terminal device does not receive data in the time domain unit used for uplink transmission, and QCL information corresponding to the time domain unit used for uplink transmission is considered as useless information. That is, the terminal device receives the downlink data based on QCL information of a time domain unit used for downlink transmission in the plurality of time domain units.

For example, a pattern of the time domain unit, for example, a pattern of a time domain unit that is used for transmission or not used for transmission within a period of time, may be predefined. In this way, the network device can enable, by indicating the pattern of the time domain unit, the terminal device to learn of a time domain unit in which the downlink data needs to be received.

In a possible implementation, the plurality of pieces of QCL information may be indicated by information carried in the DCI, that is, the DCI includes the information indicating the plurality of pieces of QCL information; or the plurality of pieces of QCL information are indicated by information carried in a plurality of pieces of DCI, and one piece of DCI carries indication information of some pieces of QCL information.

Further, the QCL information indicated by the information carried in the DCI is some of the plurality of pieces of QCL information. For example, the plurality of pieces of QCL information may be obtained by performing cyclic extension or adjacent extension on the some pieces of QCL information. For example, the plurality of time domain units are a time domain unit #1 to a time domain unit #4, the DCI may carry QCL information #1 and QCL information #2, the plurality of pieces of QCL information {the QCL information #1, the QCL information #2, the QCL information #1, the QCL information #2} may be obtained by performing cyclic extension on the QCL information carried in the DCI, and the four pieces of QCL information sequentially correspond to the time domain unit #1 to the time domain unit #4. Alternatively, the plurality of pieces of QCL information {the QCL information #1, the QCL information #1, the QCL information #2, the QCL information #2} may be obtained by performing adjacent extension on the QCL information carried in the DCI, and the four pieces of QCL information sequentially correspond to the time domain unit #1 to the time domain unit #4. It should be noted that, if a quantity of pieces of QCL information obtained after cyclic extension or adjacent extension is performed exceeds the quantity of the plurality of pieces of QCL information, redundant QCL information may be discarded. That is, at least two of the plurality of pieces of QCL information are the same. When at least two of the plurality of pieces of QCL information are the same, QCL information used for adjacent time domain units is the same, and same QCL information corresponds only to adjacent time domain units; or QCL information used for adjacent time domain units is different.

S230: The network device sends the downlink data based on the plurality of pieces of QCL information. Correspondingly, the terminal device receives the downlink data based on the plurality of pieces of QCL information.

Specifically, each network device may transmit data based on QCL information corresponding to the network device, and the terminal device receives the data in a corresponding time domain unit based on the plurality of pieces of QCL information.

According to the data transmission method provided in this application, because at least two of the plurality of pieces of QCL information corresponding to the plurality of time domain units are different, that is, at least two of a plurality of transmissions performed in the plurality of time domain units are from different network devices, a spatial correlation and a time correlation of a channel can be better used, and the data transmission reliability can be improved.

Further, each of the plurality of pieces of QCL information is associated with at least one of a redundancy version of the downlink data or an antenna port group of the downlink data.

In this application, the antenna port group may include one or more antenna ports. If the antenna port group includes only one antenna port, the antenna port group may also be referred to as an antenna port. The antenna port group may be a DMRS antenna port group, and the antenna port may be a DMRS port. However, this is not limited in this application. That is, each piece of QCL information may also be associated with a DMRS port of the downlink data.

Specifically, each piece of QCL information may be associated with one redundancy version of the downlink data; or each piece of QCL information may be associated with one antenna port group of the downlink data; or each piece of QCL information may be associated with both one redundancy version and one antenna port group (or one DMRS port group) of the downlink data.

Further, redundancy versions of the downlink data or antenna port groups of the downlink data that are associated with different QCL information may be different, or both redundancy versions of the downlink data and antenna port groups of the downlink data are different. In other words, redundancy versions of the downlink data transmitted based on different QCL information are different, or antenna port groups used for transmitting the downlink data based on different QCL information are different. The redundancy version may be considered as a code domain resource. The downlink data is transmitted by combining a time domain resource, a space domain resource, and a code domain resource, so that the data transmission reliability can be further improved.

The antenna port in this application may be indicated by using the DCI, and the DCI indicates an identifier of the antenna port. There is a one-to-one correspondence between the identifier of the antenna port and an identifier of the DMRS port.

In addition, antenna port groups corresponding to different time domain units in the plurality of time domain units may be different. However, this is not limited in this embodiment of this application.

Optionally, in an embodiment of this application, the DCI may include a plurality of pieces of TCI indication information, each piece of TCI indication information is used to indicate one TCI state, and each TCI state includes at least one of the plurality of pieces of QCL information.

For example, the DCI may include a plurality of TCI fields, and information in each TCI field is one TCI state. One TCI state may include one piece of QCL information, or may include a plurality of pieces of QCL information. In this way, the plurality of TCI fields are used to indicate the plurality of TCI states, and the TCI state can be flexibly configured.

It should be understood that if one TCI state includes only one piece of QCL information, at least two of the plurality of pieces of TCI indication information in the DCI are different. If one TCI state includes a plurality of pieces of QCL information, the plurality of pieces of QCL information may be different. However, this is not limited in this application. If a plurality of pieces of QCL information included in one TCI state are different, the plurality of pieces of TCI indication information in the DCI may be the same. However, this is not limited in this application.

Further, the plurality of pieces of TCI indication information correspond one-to-one to the plurality of time domain units. For example, it is assumed that the quantity of the plurality of time domain units is 4, the DCI may include four TCI fields, and a TCI state indicated by each TCI field corresponds to one time domain unit. QCL information included in the TCI states may be the same, or may be different. This is not limited in this application. For another example, assuming that the quantity of the plurality of time domain units is 4, and the DCI may include two TCI fields, four TCI states may be obtained by cyclically extending or adjacently extending TCI state indicated by the two TCI fields, and the four TCI states correspond one-to-one to the four time domain units.

Optionally, in an embodiment of this application, the DCI may include one piece of TCI indication information, the TCI indication information is used to indicate one TCI state group, the TCI state group includes a plurality of TCI states, and each TCI state includes at least one of the plurality of pieces of QCL information. The TCI state group may also be referred to as a TCI state sequence, a TCI state pattern, or the like.

One piece of TCI indication information is used to indicate one TCI state group to indicate the plurality of pieces of QCL information, so that signaling overheads required for configuring the QCL information can be reduced.

For example, the TCI indication information may be information in a TCI field in the DCI, and the TCI indication information may indicate one TCI state group, for example, a TCI state group #1. The TCI state group #1 includes a plurality of TCI states: {a TCI state #1, a TCI state #2, . . . }, and each TCI state in the TCI state group #1 includes one or more pieces of QCL information. A quantity of TCI states included in the TCI state group #1 may be the same as the quantity of the time domain units, and the plurality of TCI states included in the TCI state group #1 correspond one-to-one to the plurality of time domain units. Alternatively, a quantity of TCI states included in the TCI state group #1 may be different from the quantity of the time domain units. For example, the quantity of TCI states included in the TCI state group #1 may be less than the quantity of time domain units. In this case, the TCI states included in the TCI state group #1 may be cyclically extended or adjacently extended, to obtain TCI states whose quantity is the same as the quantity of the time domain units. Each TCI state may correspond to one time domain unit.

Further, the TCI state group is one of a plurality of TCI state groups, and the plurality of TCI state groups are configured by the network device by using a MAC CE. That is, the network device configures the plurality of TCI state groups by using the MAC CE, and activates one of the TCI state groups by using the DCI.

For example, the plurality of TCI state groups are TCI state groups configured by the network device by using RRC signaling. That is, the network device configures the plurality of TCI state groups for the terminal device by using the RRC signaling, configures at least two of the plurality of TCI state groups by using the MAC CE, and finally activates one of the TCI state groups by using the DCI.

For example, the network device may alternatively configure a plurality of TCI states by using RRC signaling, and then configure a plurality of TCI state groups by using a MAC CE. Each TCI state group includes one or more TCI states configured by using RRC signaling.

The TCI state described above may include at least two reference signals and QCL types corresponding to the reference signals. Two reference signals are used as an example. QCL types corresponding to the two reference signals are the same. That is, large-scale channel parameters associated with the two reference signals are the same. The two reference signals may be the same or different. That the two reference signals are the same means that the reference signals have a same identifier, and that the two reference signals are different means that the reference signals have different identifiers. The identifier may be a resource identifier. That QCL types corresponding to the two reference signals are the same may mean that two QCL types configured in the TCI state are the same, or that one QCL type configured in the TCI state corresponds to the two reference signals. That the TCI state includes the reference signal means that the TCI state includes indication information indicating the reference signal, where the indication information indicates an identifier of the reference signal or the indication information may be an identifier of the reference signal.

In an implementation, one piece of DCI may indicate one TCI state, and at least two reference signals (RS) (or RS sets) are configured for one QCL type in the TCI state. One TCI state may include a plurality of RSs (or a plurality of RS sets), and the plurality of RSs may be used for PDSCH transmissions from a plurality of network devices (for example, TRPs). Herein, the plurality of RSs (or the plurality of RS sets) are associated with a plurality of antenna port groups or a plurality of codewords. That is, one RS (or RS set) has a QCL association relationship with a DMRS in one antenna port group or one codeword. One antenna port group or one codeword is further associated with one redundancy version RV.

In another implementation, one piece of DCI may indicate two TCI states, and the two TCI states are used for a PDSCH in a same time domain unit. One TCI state may include a plurality of pieces of QCL information having a same QCL type, and the plurality of pieces of QCL information may be used for PDSCH transmissions from a plurality of network devices. One TCI state is used to indicate a QCL relationship of one antenna port group or one codeword. Herein, one TCI state is associated with one redundancy version.

The following describes possible forms of the TCI state by using examples.

Form 1

The TCI state includes first QCL information and second QCL information. The first QCL information includes a first reference signal and a first QCL type, the second QCL information includes a second reference signal and the first QCL type. The first reference signal is the same as or different from the second reference signal, the first reference signal and a first antenna port group satisfy a QCL relationship, and the second reference signal and a second antenna port group satisfy the QCL relationship.

The QCL relationship between the first reference signal and the first antenna port group and the QCL relationship between the second reference signal and the second antenna port group may be predefined. For example, a reference signal having a smaller identifier may be predefined to correspond to an antenna port group having a smaller identifier. However, this is not limited in this embodiment of this application. In addition, the TCI state may further include the first antenna port group having the QCL relationship with the first reference signal and the second antenna port group having the QCL relationship with the second reference signal.

Further, the first QCL type is the QCL type A.

For example, one TCI state may include:
an RS #1 and the corresponding QCL type A; and
an RS #2 and the corresponding QCL type A.

The RS #1 and the RS #2 are two different reference signals.

For example, one TCI state may include:
an RS #1 and the corresponding QCL type A, and
a DMRS group #1; and
an RS #2 and the corresponding QCL type A, and
a DMRS group #2.

The RS #1 and the RS #2 are two different reference signals, and the DMRS group #1 and the DMRS group #2 are two different antenna port groups.

Further, the first antenna port group and the second antenna port group are associated with a same time domain unit in the plurality of time domain units. Alternatively, the first antenna port group and the second antenna port group are respectively associated with different time domain units in the plurality of time domain units. In this case, it may be understood that one TCI state may correspond to two time domain units.

Form 2

The TCI state includes first QCL information and second QCL information. The first QCL information includes a first reference signal and a first QCL type, and a third reference signal and a second QCL type, and the second QCL information includes a second reference signal and the first QCL type, and a fourth reference signal and the second QCL type. The first reference signal is different from the second reference signal, and the third reference signal is different from the fourth reference signal. Both the first reference signal and the third reference signal have a QCL relationship with a first antenna port group, and both the second reference signal and the fourth reference signal have the QCL relationship with a second antenna port group.

The QCL relationship between the first reference signal and the first antenna port group and the QCL relationship between the second reference signal and the second antenna port group may be predefined. However, this is not limited in this embodiment of this application. For example, the TCI state may include the first antenna port group having the QCL relationship with the first reference signal and the third reference signal, and the second antenna port group having the QCL relationship with the second reference signal and the fourth reference signal.

Further, the first QCL type is the QCL type A, and the second QCL type is the QCL type D.

For example, one TCI state may include:
an RS #1 and the corresponding QCL type A;
an RS #3 and the corresponding QCL type D;
an RS #2 and the corresponding QCL type A; and
an RS #4 and the corresponding QCL type D.

The RS #1 and the RS #2 are two different reference signals, the RS #3 and the RS #4 are two different reference signals, the RS #1 and the RS #3 are different, and the RS #2 and the RS #4 are different.

For example, one TCI state may include:
an RS #1 and the corresponding QCL type A,
an RS #3 and the corresponding QCL type D, and
a DMRS group #1; and
an RS #2 and the corresponding QCL type A,
an RS #4 and the corresponding QCL type D, and
a DMRS group #2.

The RS #1 and the RS #2 are two different reference signals, the RS #3 and the RS #4 are two different reference signals, the RS #1 and the RS #3 are different, the RS #2 and the RS #4 are different, and the DMRS group #1 and the DMRS group #2 are two different DMRS port groups. An identifier of the DMRS group #1 corresponds to an identifier of the first antenna port group, and an identifier of the DMRS group #2 corresponds to an identifier of the second antenna port group.

Further, the DMRS group #1 and the DMRS group #2 are associated with a same time domain unit in the plurality of time domain units. Alternatively, the DMRS group #1 and the DMRS group #2 are respectively associated with different time domain units in the plurality of time domain units. In this case, it may be understood that one TCI state may correspond to two time domain units.

Form 3

The TCI state includes a first reference signal, a second reference signal, and a corresponding first QCL type. The first reference signal is different from the second reference signal, the first reference signal and a first antenna port group satisfy a QCL relationship, and the second reference signal and a second antenna port group satisfy the QCL relationship.

The QCL relationship between the first reference signal and the first antenna port group and the QCL relationship between the second reference signal and the second antenna port group may be predefined. However, this is not limited in this embodiment of this application. For example, the TCI state may include the first antenna port group having the QCL relationship with the first reference signal and the second antenna port group having the QCL relationship with the second reference signal.

Further, the first QCL type is the QCL type A.

The form 3 may be understood as a transformation of the form 1. In the form 3, it may be considered that the first reference signal and the first QCL type belong to first QCL information, and it may be considered that the second reference signal and the first QCL type belong to second QCL information.

For example, one TCI state may include:
the QCL type A, and
an RS #1 and an RS #2.

The RS #1 and the RS #2 are two different reference signals.

For example, one TCI state may include:
the QCL type A,
an RS #1 and a DMRS group #1, and
an RS #2 and a DMRS group #2.

The RS #1 and the RS #2 are two different reference signals, and the DMRS group #1 and the DMRS group #2 are two different DMRS port groups. An identifier of the DMRS group #1 corresponds to an identifier of the first antenna port group, and an identifier of the DMRS group #2 corresponds to an identifier of the second antenna port group.

Further, the DMRS group #1 and the DMRS group #2 are associated with a same time domain unit in the plurality of time domain units. Alternatively, the DMRS group #1 and the DMRS group #2 are respectively associated with different time domain units in the plurality of time domain units. In this case, it may be understood that one TCI state may correspond to two time domain units.

Form 4

The TCI state includes a first reference signal, a second reference signal, and a first QCL type corresponding to the first reference signal and the second reference signal; and a third reference signal, a fourth reference signal, and a second QCL type corresponding to the third reference signal and the fourth reference signal. The first reference signal is different from the second reference signal, the first reference signal and a first antenna port group satisfy a QCL relationship, and the second reference signal and a second antenna port group satisfy the QCL relationship. The first reference signal is different from the second reference signal, and the third reference signal is different from the fourth reference signal. Both the first reference signal and the third reference signal have the QCL relationship with the first antenna port group, and both the second reference signal and the fourth reference signal have the QCL relationship with the second antenna port group.

The QCL relationship between the first reference signal and the first antenna port group and the QCL relationship between the second reference signal and the second antenna port group may be predefined. However, this is not limited in this embodiment of this application. For example, the TCI state may include the first antenna port group having the QCL relationship with the first reference signal and the third reference signal, and the second antenna port group having the QCL relationship with the second reference signal and the fourth reference signal.

Further, the first QCL type is the QCL type A, and the second QCL type is the QCL type D.

The form 4 may be understood as a transformation of the form 2. In the form 4, it may be considered that the first reference signal and the first QCL type, and the third reference signal and the second QCL type belong to first QCL information, and it may be considered that the second reference signal and the first QCL type, and the fourth reference signal and the second QCL type belong to second QCL information.

For example, one TCI state may include:
the QCL type A, and
an RS #1 and an RS #2; and
the QCL type D, and
an RS #3 and an RS #4.

The RS #1 and the RS #2 are two different reference signals, the RS #3 and the RS #4 are two different reference signals, the RS #1 and the RS #3 are different, and the RS #2 and the RS #4 are different.

For example, one TCI state may include:
the QCL type A,
an RS #1 and a DMRS group #1, and
an RS #2 and a DMRS group #2; and
the QCL type D,
an RS #3 and the DMRS group #1, and
an RS #4 and the DMRS group #2.

The RS #1 and the RS #2 are two different reference signals, the RS #3 and the RS #4 are two different reference signals, the RS #1 and the RS #3 are different, the RS #2 and the RS #4 are different, and the DMRS group #1 and the DMRS group #2 are two different DMRS port groups. An identifier of the DMRS group #1 corresponds to an identifier of the first antenna port group, and an identifier of the DMRS group #2 corresponds to an identifier of the second antenna port group.

Further, the DMRS group #1 and the DMRS group #2 are associated with a same time domain unit in the plurality of time domain units. Alternatively, the DMRS group #1 and the DMRS group #2 are respectively associated with different time domain units in the plurality of time domain units. In this case, it may be understood that one TCI state may correspond to two or more time domain units.

For example, the reference signal included in the QCL information may be a non-zero power (NZP) CSI-RS reference signal, a synchronization signal block SSB, or a sounding reference signal SRS.

Optionally, each TCI state in this application may be further associated with the redundancy version of the downlink data. The association relationship between the TCI state and the redundancy version may be predefined or may be configured by a higher layer. In this case, information about the associated RV version may be determined based on the TCI state.

Optionally, each TCI state in this application may be further associated with information about the antenna port group. For example, the association relationship between the TCI state and the antenna port group may be predefined or configured by a higher layer. One antenna port group may be associated with a plurality of TCI states. After a TCI state is determined, a corresponding antenna port group may be determined.

Optionally, in an embodiment of this application, the terminal device may determine a time-frequency resource mapping position of a phase tracking reference signal (PTRS) based on the plurality of pieces of QCL information. For example, when two adjacent time domain units correspond to different QCL information, a smallest mapped time domain symbol of the PTRS in a time domain unit having a larger identifier is a time domain symbol determined based on the time domain unit.

Optionally, in an embodiment of this application, when a scheduling latency of the downlink data is less than a threshold, at least one of the plurality of pieces of QCL information has a correspondence with a control resource set (CORESET). For example, the QCL information is configured in configuration information of the CORESET. The QCL information used to determine the data may be further used to determine a QCL relationship of a control channel (PDCCH) transmitted in the CORESET. The plurality of pieces of QCL information used to determine the data further include some pieces of QCL information that may be used to determine the QCL relationship of the control channel PDCCH transmitted in the CORESET. The QCL relationship of the PDCCH is a quasi-co-location relationship between a DMRS and a reference signal on the PDCCH, where the reference signal is reference information in the QCL information. The scheduling latency in this application is a time interval from a time point at which the DCI is sent to a time point at which a downlink data channel is sent, or a time interval from a time point at which the DCI is received to a time point at which a downlink data channel is received.

The scheduling latency is duration between a time domain unit in which the DCI is located and the first time domain unit or any one of the plurality of time domain units. The plurality of time domain units are time domain units corresponding to the plurality of pieces of QCL information.

For example, the scheduling latency is a time interval between a slot for sending the DCI and the first slot in a plurality of slots for sending a PDSCH, or a time interval between a slot for sending the DCI and any slot in a plurality of slots for sending a PDSCH. For another example, the scheduling latency is a time interval between a slot for receiving the DCI and the first slot in a plurality of slots for receiving a PDSCH, or a time interval between a slot for receiving the DCI and any slot in a plurality of slots for receiving a PDSCH.

It should be understood that sequence numbers of the processes do not mean execution sequences in the foregoing embodiment. The execution sequences of the processes should be determined based on functions and internal logic of the processes, and should not constitute any limitation on the implementation processes of the embodiments of this application.

According to the data transmission method provided in this application, because at least two of the plurality of pieces of QCL information corresponding to the plurality of time domain units are different, that is, at least two of a plurality of transmissions performed in the plurality of time domain units are from different network devices, the data transmission reliability can be improved. The data transmission method provided in the embodiments of this application is described above in detail with reference to FIG. 2 and FIG. 3. The following describes in detail communication apparatuses in the embodiments of this application with reference to FIG. 4 to FIG. 6.

Figure 4:
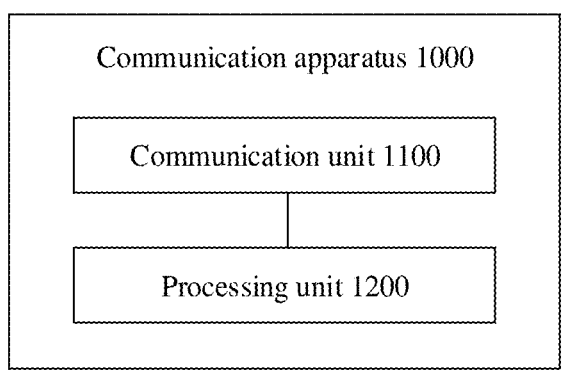
FIG. 4 is a schematic block diagram of a communication apparatus according to an embodiment of this application.

FIG. 4 is a schematic block diagram of a communication apparatus 1000 according to an embodiment of this application. As shown in the figure, the communication apparatus 1000 may include a communication unit 1100 and a processing unit 1200.

In a possible design, the communication apparatus 1000 may correspond to the terminal device in the foregoing method embodiments, for example, may be a terminal device, or may be a chip disposed in a terminal device.

Specifically, the communication apparatus 1000 may correspond to the terminal device in the method 200 according to the embodiments of this application. The communication apparatus 1000 may include units configured to perform the method performed by the terminal device in the method 200 in FIG. 2. In addition, the units in the communication apparatus 1000 and the foregoing other operations and/or functions are separately used to implement corresponding procedures of the method 200 in FIG. 2.

The communication unit 1100 is configured to receive downlink control information DCI. The processing unit 1200 is configured to determine a plurality of pieces of quasi-co-location QCL information based on the DCI, where the plurality of pieces of QCL information correspond to a plurality of time domain units, each time domain unit corresponds to at least one piece of QCL information, and at least two of the plurality of pieces of QCL information are different. The communication unit 1100 is further configured to receive downlink data based on the plurality of pieces of QCL information.

In another possible design, the communication apparatus 1000 may correspond to the network device in the foregoing method embodiments, for example, may be a network device, or a chip disposed in a network device.

Specifically, the communication apparatus 1000 may correspond to the network device in the method 200 or the method 500 in the embodiments of this application. The communication apparatus 1000 may include units configured to perform the method performed by the network device in the method 200 in FIG. 2. In addition, the units in the communication apparatus 1000 and the foregoing other operations and/or functions are separately used to implement corresponding procedures of the method 200 in FIG. 2.

The communication unit 1100 is configured to: send downlink control information DCI, where the DCI includes a plurality of pieces of quasi-co-location QCL information, the plurality of pieces of QCL information correspond to a plurality of time domain units, each time domain unit corresponds to at least one piece of QCL information, and at least two of the plurality of pieces of QCL information are different; and send downlink data based on the plurality of pieces of QCL information.

With reference to the foregoing two possible designs, optionally, the plurality of pieces of QCL information are used for a plurality of re-transmissions of the same downlink data.

Optionally, each piece of QCL information is associated with at least one of a redundancy version of the downlink data or a port group of the downlink data.

Optionally, the DCI includes a plurality of pieces of transmission configuration indicator TCI indication information, each piece of TCI indication information is used to indicate one TCI state, and each TCI state includes at least one of the plurality of pieces of QCL information.

Optionally, the DCI includes one piece of transmission configuration indicator TCI indication information, the TCI indication information is used to indicate one TCI state group, the TCI state group includes a plurality of TCI states, and each TCI state includes at least one of the plurality of pieces of QCL information.

Optionally, the TCI state group is one of a plurality of TCI state groups, and the plurality of TCI state groups are configured by the network device by using a media access control control element MAC CE.

Optionally, the plurality of TCI state groups are TCI state groups configured by the network device by using RRC signaling.

Optionally, the plurality of TCI states correspond one-to-one to the plurality of time domain units.

Optionally, the plurality of TCI states correspond to the plurality of time domain units through cyclic extension or adjacent extension.

Optionally, the TCI state includes first QCL information and second QCL information, the first QCL information indicates a first reference signal and a first QCL type, the second QCL information indicates a second reference signal and the first QCL type, the first reference signal is different from the second reference signal, the first reference signal and a first antenna port group satisfy a QCL relationship, and the second reference signal and a second antenna port group satisfy the QCL relationship.

Optionally, the first QCL information further indicates a third reference signal and a second QCL type, the second QCL information further indicates a fourth reference signal and the second QCL type, the third reference signal is different from the fourth reference signal, the third reference signal and the first antenna port group satisfy the QCL relationship, and the fourth reference signal and the second antenna port group satisfy the QCL relationship.

Optionally, the first antenna port group and the second antenna port group are associated with a same time domain unit in the plurality of time domain units.

It should be understood that a specific process in which each unit performs the foregoing corresponding operation is described in detail in the foregoing method embodiments. For brevity, details are not described herein again.

According to the communication apparatus provided in this application, because at least two of the plurality of pieces of QCL information corresponding to the plurality of time domain units are different, that is, at least two of a plurality of transmissions performed in the plurality of time domain units are from different network devices, data transmission reliability can be improved.

Figure 5:
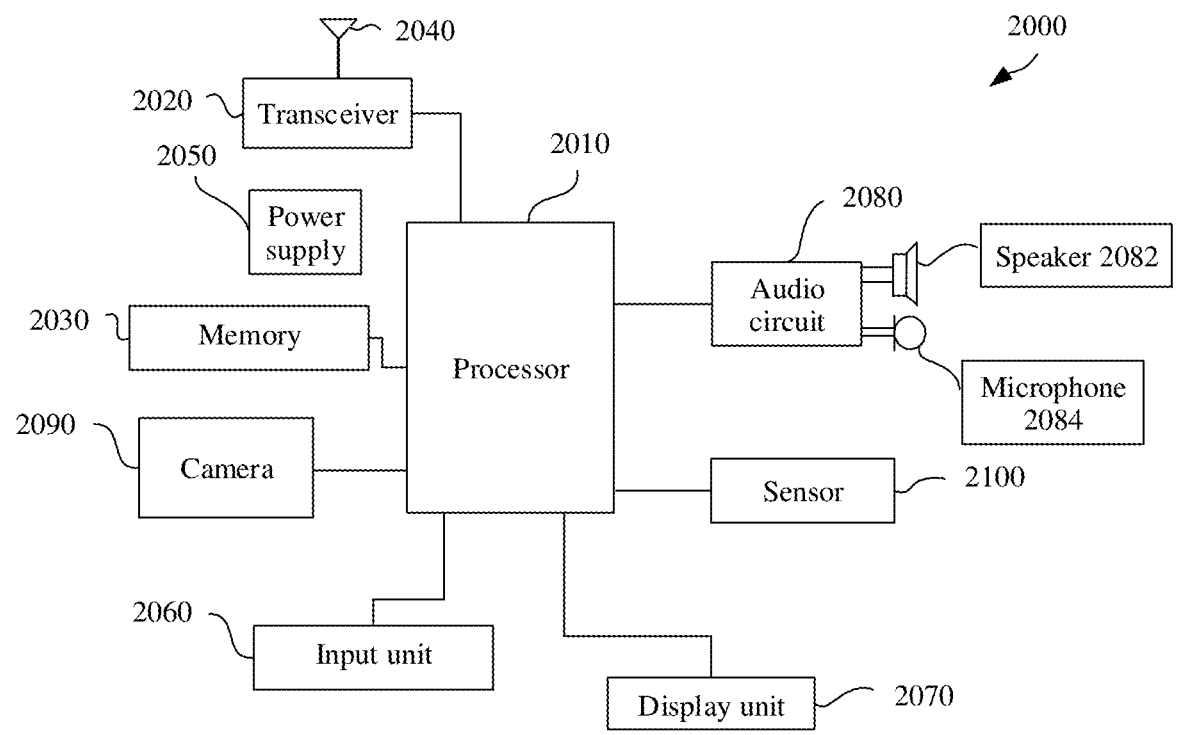
FIG. 5 is a schematic structural diagram of a terminal device according to an embodiment of this application.

It should be understood that when the communication apparatus 1000 is the terminal device, the communication unit 1100 in the communication apparatus 1000 may correspond to a transceiver 2020 in a terminal device 2000 shown in FIG. 5, and the processing unit 1200 in the communication apparatus 1000 may correspond to a processor 2010 in the terminal device 2000 shown in FIG. 5.

It should be further understood that when the communication apparatus 1000 is the chip disposed in the terminal device, the communication unit 1100 in the communication apparatus 1000 may be an input/output interface.

Figure 6:
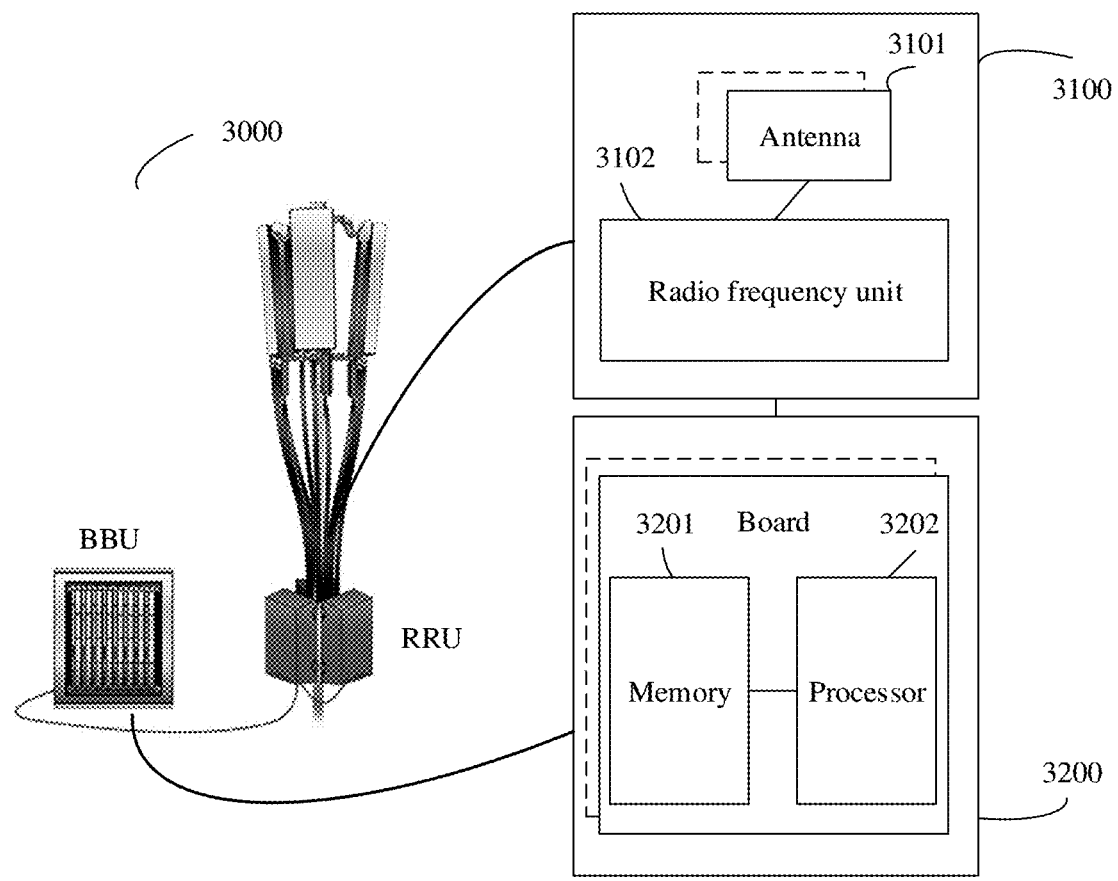
FIG. 6 is a schematic structural diagram of a network device according to an embodiment of this application.

It should be understood that when the communication apparatus 1000 is the network device, the communication unit in the communication apparatus 1000 may correspond to a transceiver 3200 in a network device 3000 shown in FIG. 6, and the processing unit 1200 in the communication apparatus 1000 may correspond to a processor 3100 in the network device 3000 shown in FIG. 6.

It should be further understood that when the communication apparatus 1000 is the chip disposed in the network device, the communication unit 1100 in the communication apparatus 1000 may be an input/output interface.

FIG. 5 is a schematic structural diagram of the terminal device 2000 according to an embodiment of this application. The terminal device 2000 may be applied to the system shown in FIG. 1, to perform functions of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program in the memory 2030 and run the computer program, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 4.

The transceiver 2020 may correspond to the communication unit in FIG. 4, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 5 can implement each process of the terminal device in the method embodiment in FIG. 2. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 6 is a schematic structural diagram of a base station 3000 according to an embodiment of this application, for example, may be a schematic structural diagram of a base station. The base station 3000 may be applied to the system shown in FIG. 1, to perform functions of the network device in the foregoing method embodiments. As shown in the figure, the base station 3000 may include one or more radio frequency units, for example, one or more remote radio units (RRU) 3100, and one or more baseband units (BBU) (which may also be referred to as distributed units (DU)) 3200. The RRU 3100 may be referred to as a transceiver unit, and corresponds to the communication unit 1100 in FIG. 4. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: send and receive a radio frequency signal, and perform conversion between the radio frequency signal and a baseband signal. For example, the RRU 3100 is configured to send DCI to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, may also be referred to as a processing unit. The BBU may correspond to the processing unit 1200 in FIG. 4, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing DCI.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and necessary data. The processor 3202 is configured to control the base station to perform a necessary action, for example, configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may further be disposed on each board.

It should be understood that the base station 3000 shown in FIG. 6 can implement each process of the network device in the method embodiment in FIG. 2. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated circuit (ASIC), a system on a-chip (SoC), a central processing unit (CPU), a network processor (NP), a digital signal processing circuit (DSP), a micro controller unit (MCU), a programmable logic device (PLD), or another integrated chip.

In an implementation process, the operations in the foregoing method may be implemented by using a hardware integrated logic circuit in the processor, or by using instructions in a form of software. The operations of the methods disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in the embodiments of this application may be an integrated circuit chip, and has a signal processing capability. In an implementation process, the operations in the foregoing method embodiments may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, operations, and logical block diagrams that are disclosed in the embodiments of this application. The general purpose processor may be a microprocessor, or the processor may be any conventional processor, or the like. The operations of the methods disclosed with reference to the embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

According to the method provided in the embodiments of this application, this application further provides a computer program product. The computer program product includes computer program code. When the computer program code is run on a computer, the computer is enabled to perform the method in either of the embodiments shown in FIG. 2 and FIG. 5.

According to the method provided in the embodiments of this application, this application further provides a computer-readable medium. The computer-readable medium stores program code. When the program code is run on a computer, the computer is enabled to perform the method in the embodiment shown in FIG. 2.

According to the method provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device and the terminal device in the method embodiments. A corresponding module or unit performs a corresponding operation. For example, the communication unit (the transceiver) performs a receiving or sending operation in the method embodiments, and an operation other than the sending operation and the receiving operation may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that, various illustrative logical blocks (illustrative logical block) and operations (operation) that are described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

In the foregoing embodiments, all or some of functions of the function units may be implemented by software, hardware, firmware, or any combination thereof. When software is used to implement the functions, all or some of the functions may be implemented in a form of a computer program product. The computer program product includes one or more computer instructions (programs). When the computer program instructions (programs) are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a solid-state drive (SSD)), or the like.

When functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving downlink control information (DCI);
   determining a plurality of pieces of quasi-co-location (QCL) information based on the DCI, wherein the plurality of pieces of QCL information correspond to a plurality of time domain units, and each time domain unit corresponds to at least one piece of QCL information; and
   receiving downlink data based on the plurality of pieces of QCL information,
   wherein the DCI comprises at least one piece of transmission configuration indicator (TCI) indication information, the at least one piece of TCI indication information indicating a TCI state, and
   wherein the TCI state comprises first QCL information and second QCL information, the first QCL information comprises a first reference signal and a first QCL type, the second QCL information comprises a second reference signal and the first QCL type, the first reference signal is different from the second reference signal, the first reference signal and a first antenna port group satisfy a QCL relationship, and the second reference signal and a second antenna port group satisfy the QCL relationship.

2. The method according to claim 1, wherein the plurality of pieces of QCL information are used for a plurality of re-transmissions of the same downlink data.

3. The method according to claim 2, wherein each piece of QCL information is associated with at least one of a redundancy version of the downlink data or an antenna port group of the downlink data.

4. The method according to claim 1, wherein the at least one piece of TCI indication information DCI comprises a plurality of pieces of TCI indication information, each piece of TCI indication information of the plurality of pieces of TCI indication information indicates one TCI state comprising at least one of the plurality of pieces of QCL information.

5. The method according to claim 4, wherein the first QCL information further comprises a third reference signal and a second QCL type, the second QCL information further comprises a fourth reference signal and the second QCL type, the third reference signal is different from the fourth reference signal, the third reference signal and the first antenna port group satisfy the QCL relationship, and the fourth reference signal and the second antenna port group satisfy the QCL relationship.

6. The method according to claim 4, wherein the first antenna port group and the second antenna port group are associated with a same time domain unit in the plurality of time domain units.

7. The method according to claim 1, wherein the at least one piece of TCI indication information comprises one piece of TCI indication information indicating one TCI state group comprising a plurality of TCI states, and each TCI state comprises at least one of the plurality of pieces of QCL information.

8. The method according to claim 7, wherein the TCI state group is one of a plurality of TCI state groups, and the plurality of TCI state groups are configured by a network device by using a media access control control element (MAC CE).

9. The method according to claim 8, wherein the plurality of TCI state groups are TCI state groups configured by the network device by using radio resource control RRC signaling.

10. The method according to claim 7, wherein the plurality of TCI states correspond one-to-one to the plurality of time domain units.

11. The method according to claim 7, wherein the plurality of TCI states correspond to the plurality of time domain units through cyclic extension or adjacent extension.

12. The method according to claim 11, wherein a quantity of the plurality of TCI states is 2, and a quantity of the plurality of time domain units is 4; and
   that the plurality of TCI states correspond to the plurality of time domain units through cyclic extension comprises: the first TCI state in the plurality of TCI states corresponds to the first time domain unit and the third time domain unit in the plurality of time domain units, and the second TCI state in the plurality of TCI states corresponds to the second time domain unit and the fourth time domain unit in the plurality of time domain units; or that the plurality of TCI states correspond to the plurality of time domain units through adjacent extension comprises: the first TCI state in the plurality of TCI states corresponds to the first time domain unit and the second time domain unit in the plurality of time domain units, and the second TCI state in the plurality of TCI states corresponds to the third time domain unit and the fourth time domain unit in the plurality of time domain units.

13. A communication apparatus, comprising at least one processor, wherein the at least one processor is configured to perform the method according to claim 1.

14. A data transmission method, comprising:
   receiving downlink control information (DCI);
   determining a plurality of pieces of quasi-co-location (QCL) information based on the DCI, wherein the plurality of pieces of QCL information correspond to a plurality of time domain units, and each time domain unit corresponds to at least one piece of QCL information; and receiving downlink data based on the plurality of pieces of QCL information, wherein if the plurality of time domain units comprise a time domain unit used for uplink transmission, QCL information corresponding to the time domain unit used for uplink transmission is not used.

15. A communication apparatus, comprising:
a communication unit, configured to receive downlink control information (DCI); and
a processing unit, configured to determine a plurality of pieces of quasi-co-location (QCL) information based on the DCI, wherein the plurality of pieces of QCL information correspond to a plurality of time domain units, and each time domain unit corresponds to at least one piece of QCL information, wherein
the communication unit is further configured to receive downlink data based on the plurality of pieces of QCL information,
wherein the DCI comprises at least one piece of transmission configuration indicator (TCI) indication information, the at least one piece of TCI indication information indicating a TCI state, and
wherein the TCI state comprises first QCL information and second QCL information, the first QCL information comprises a first reference signal and a first QCL type, the second QCL information comprises a second reference signal and the first QCL type, the first reference signal is different from the second reference signal, the first reference signal and a first antenna port group satisfy a QCL relationship, and the second reference signal and a second antenna port group satisfy the QCL relationship.

16. The apparatus according to claim 15, wherein the plurality of pieces of QCL information are used for a plurality of re-transmissions of the same downlink data.

17. The apparatus according to claim 16, wherein each piece of QCL information is associated with at least one of a redundancy version of the downlink data or an antenna port group of the downlink data.

18. The apparatus according to claim 15, wherein the at least one piece of TCI indication information comprises a plurality of pieces of TCI indication information, each piece of TCI indication information of the plurality of pieces of TCI indication information indicating one TCI state comprising at least one of the plurality of pieces of QCL information.

19. The apparatus according to claim 18, wherein the first QCL information further comprises a third reference signal and a second QCL type, the second QCL information further comprises a fourth reference signal and the second QCL type, the third reference signal is different from the fourth reference signal, the third reference signal and the first antenna port group satisfy the QCL relationship, and the fourth reference signal and the second antenna port group satisfy the QCL relationship.

20. The apparatus according to claim 18, wherein the first antenna port group and the second antenna port group are associated with a same time domain unit in the plurality of time domain units.

21. The apparatus according to claim 15, wherein the at least one piece of TCI indication information comprises one piece of TCI indication information indicating one TCI state group comprising a plurality of TCI states, and each TCI state comprises at least one of the plurality of pieces of QCL information.

22. The apparatus according to claim 21, wherein the TCI state group is one of a plurality of TCI state groups, and the plurality of TCI state groups are configured by a network device by using a media access control control element (MAC CE).

23. The apparatus according to claim 22, wherein the plurality of TCI state groups are TCI state groups configured by the network device by using radio resource control RRC signaling.

24. The apparatus according to claim 21, wherein the plurality of TCI states correspond one-to-one to the plurality of time domain units.

25. The apparatus according to claim 21, wherein the plurality of TCI states correspond to the plurality of time domain units through cyclic extension or adjacent extension.

26. The apparatus according to claim 25, wherein a quantity of the plurality of TCI states is 2, and a quantity of the plurality of time domain units is 4; and that the plurality of TCI states correspond to the plurality of time domain units through cyclic extension comprises: the first TCI state in the plurality of TCI states corresponds to the first time domain unit and the third time domain unit in the plurality of time domain units, and the second TCI state in the plurality of TCI states corresponds to the second time domain unit and the fourth time domain unit in the plurality of time domain units; or that the plurality of TCI states correspond to the plurality of time domain units through adjacent extension comprises: the first TCI state in the plurality of TCI states corresponds to the first time domain unit and the second time domain unit in the plurality of time domain units, and the second TCI state in the plurality of TCI states corresponds to the third time domain unit and the fourth time domain unit in the plurality of time domain units.

27. A communication apparatus, comprising:
a communication unit, configured to receive downlink control information (DCI); and
a processing unit, configured to determine a plurality of pieces of quasi-co-location (QCL) information based on the DCI, wherein the plurality of pieces of QCL information correspond to a plurality of time domain units, and each time domain unit corresponds to at least one piece of QCL information, wherein
the communication unit is further configured to receive downlink data based on the plurality of pieces of QCL information,
wherein if the plurality of time domain units comprise a time domain unit used for uplink transmission, QCL information corresponding to the time domain unit used for uplink transmission is not used.

* * * * *